United States Patent
Yun et al.

(10) Patent No.: US 7,548,511 B2
(45) Date of Patent: Jun. 16, 2009

(54) APPARATUS AND METHOD FOR PRESERVING FRAME SEQUENCE AND DISTRIBUTING TRAFFIC IN MULTI-CHANNEL LINK AND MULTI-CHANNEL TRANSMITTER USING THE SAME

(75) Inventors: Hyun Ho Yun, Daejeon (KR); Tae Yeon Kim, Daejeon (KR); Jeong Ju Yoo, Daejeon (KR); Byoung Whi Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 679 days.

(21) Appl. No.: 11/124,453

(22) Filed: May 5, 2005

(65) Prior Publication Data

US 2006/0133382 A1 Jun. 22, 2006

(30) Foreign Application Priority Data

Dec. 20, 2004 (KR) .................. 10-2004-0108920

(51) Int. Cl.
- *G08C 15/00* (2006.01)
- *H04L 12/56* (2006.01)
- *H04J 14/00* (2006.01)
- *H04B 10/00* (2006.01)

(52) U.S. Cl. .............. 370/230; 370/235; 370/394; 370/412; 398/53; 398/161

(58) Field of Classification Search .......... 370/230, 370/235, 394, 412
See application file for complete search history.

(56) References Cited

U.S. PATENT DOCUMENTS

| | | | | |
|---|---|---|---|---|
| 5,469,284 A | * | 11/1995 | Haas | 398/54 |
| 5,563,885 A | * | 10/1996 | Witchey | 370/391 |
| 5,822,317 A | * | 10/1998 | Shibata | 370/395.62 |
| 6,314,101 B1 | * | 11/2001 | Rezaiifar et al. | 370/394 |
| 6,512,742 B1 | | 1/2003 | Alexander | |
| 2002/0118421 A1 | * | 8/2002 | Xiong et al. | 359/140 |
| 2004/0100977 A1 | * | 5/2004 | Suzuki et al. | 370/401 |
| 2005/0041970 A1 | * | 2/2005 | Harai | 398/51 |

FOREIGN PATENT DOCUMENTS

| | | |
|---|---|---|
| KR | 1020030033407 | 5/2003 |
| KR | 1020040074680 | 8/2004 |

\* cited by examiner

*Primary Examiner*—Hassan Kizou
*Assistant Examiner*—Ryan C Kavleski
(74) *Attorney, Agent, or Firm*—Blakely, Sokoloff, Taylor & Zafman

(57) ABSTRACT

The present invention provides an apparatus and method for preserving a frame sequence and distributing traffic in a multi-channel link, which efficiently distributes frame traffic while preserving the transmission sequence of frames in a link composed of multiple channels, and to a multi-channel transmitter using the apparatus and method. The present invention determines whether the preservation of a sequence of frames is required using information about received frames, predicts a frame transmission service finish time on the basis of the length of frames if the sequence preservation is required, determines a sequence preservation service time (SPST) on the basis of the predicted transmission service finish time, stores the frames in a sequence preservation buffer for the SPST, and distributes the frames to idle transmitters at a termination point of the SPST, thus maximizing the efficiency of channel use.

8 Claims, 4 Drawing Sheets

APPARATUS AND METHOD FOR PRESERVING FRAME SEQUENCE AND DISTRIBUTING TRAFFIC IN MULTI-CHANNEL LINK AND MULTI-CHANNEL TRANSMITTER USING THE SAME

BACKGROUND OF THE INVENTION

1. Field of the Invention

The present invention relates, in general, to a frame transmission service in a multi-channel link and, more particularly, to an apparatus and method for preserving a frame sequence and distributing traffic in a multi-channel link, which efficiently distributes frame traffic while preserving the transmission sequence of frames in a link composed of multiple channels, and to a multi-channel transmitter using the apparatus and method.

2. Description of the Prior Art

Generally, a Wavelength Division Multiplexing (WDM)/Subcarrier Multiplexing (SCM)-Passive Optical Network (PON) based on WDM and SCM must support a multi-channel aggregation function so as to efficiently transmit variable-length frames through multiple channels.

For technology supporting a broad bandwidth required by a user using a digital communication service, there is Passive Optical Network (PON) technology. The PON is a subscriber distribution network for connecting communication channels required between a service provider's central office and a subscriber device to each other through optical wavelengths using optical passive elements. In order to couple a plurality of subscriber lines to a PON, a terminator connected to each subscriber side is designated as an Optical Network Unit (ONU), and a terminator connected to a service provider's central office side is designated as an Optical Line Terminal (OLT).

Fundamentally, since a plurality of ONUs is aggregated through an optical splitter in the PON, a plurality of subscribers shares a link from the optical splitter to a single OLT. Therefore, in an upstream service for transmitting from a subscriber side to a central office side, a multiplexing scheme for a shared link from the optical splitter to an OLT is required.

Research on WDM/SCM-PON establishing a link using WDM and SCM to perform communication required between an OLT and a plurality of ONUs has been actively conducted.

Such a WDM/SCM-PON uses an Arrayed Wavelength Grating (AWG) and an optical splitter/combiner, which are passive elements, to physically connect a plurality of ONUs. A link between the plurality of ONUs and the OLT is composed of a plurality of wavelengths and a plurality of subcarriers.

However, in the WDM/SCM-PON, a plurality of SCM channels coexists with respect to a single wavelength, so that a transmission band can extend by connecting ONUs to the OLT through the plurality of SCM channels in a point-to-point manner. In the case of a multi-channel link connected through the plurality of SCM channels in this way, technology preserving the sequence of frames at the time of transmission/reception is required. The Institute of Electrical and Electronics Engineers (IEEE) 802.3 link aggregation standard proposes a scheme of dividing traffic to be simply transmitted through a link into several conversations and preserving the frame sequence only within the conversations. Therefore, when the number of divisible conversations is small, or when bands between conversations are not uniformly configured, a link cannot be efficiently used.

In relation to this technology, several schemes of preserving the transmission sequence of frames have been proposed. For example, a padding method of transmitting a frame received from an upper system in 1523 octets, which is the maximum length available for Ethernet frame transmission, is disadvantageous in that it is very inefficient with respect to traffic including frames having short lengths, and in that a reception unit must extract a padding part.

Further, as another method, a division method of regularizing the length of frames by dividing the frames into sub-frames having regular lengths and by transmitting the sub-frames without padding the frames, is disadvantageous in that transmission/reception processing is complicated because each frame to be transmitted is divided into small sub-frames having regular lengths, a header including new division information is added to the sub-frames, the sub-frames having the header are transmitted, and a receiving side reconstructs the sub-frames on the basis of the header information. Further, since this division method cannot maintain compatibility with a lower layer (that is, WDM/SCM-PHY), a new physical layer is required.

As a further method, a tagging method of indicating a transmission sequence on frames is a method of writing the transmission sequence on a header, tagging the header to frames, and transmitting the frames tagged with the header. This tagging method is problematic in that the frames must be reconstructed with reference to the header information of received frames, and is disadvantageous in that the implementation of the method is highly complicated, for example, it requires the revision of standard protocols.

Therefore, it is impossible to efficiently use resources using only the conventional methods when a link is implemented using multiple channels as in the case of the WDM/SCM-PON.

In the meantime, Korean Patent Laid-Open Publication No. 2004-0074680, entitled "Method of distributing frame traffic in link aggregation Ethernet that balances and transmits frames through a plurality of links between applications", discloses a method of comparing a currently received frame with a previous frame, and distributing the current frame to the same buffer when the current frame is smaller than the previous frame or when it does not contain length information. This method differs from the present invention of distributing traffic on the basis of a time at which a transmission service terminates using an actual measured frame length.

Further, U.S. Pat. No. 6,512,742 B1, entitled "System for data transmission across a link aggregation", discloses a method of transmitting the same flow through the same link to preserve the frame sequence with respect to the flow, and determining transmission links of different flows in terms of load balancing without preserving a frame sequence with respect to different flows. This method differs from the present invention which primarily considers load balancing to select a channel and preserves the sequence of frames, entailing the possibility of a reorder problem occurring.

Moreover, Korean Patent Laid-Open Publication No. 2003-0033407, entitled "Packet realignment method", proposes a method of realigning frames on a receiving side even if the sequence of frames is inverted during a frame transmission process. However, this patent differs from the present invention which provides a method of fundamentally preventing the inversion of a frame sequence.

SUMMARY OF THE INVENTION

The present invention provides an apparatus and method for preserving a frame sequence and distributing traffic in a multi-channel link, which can efficiently distribute frame traffic while preserving the sequence of frames using frame information in a link composed of multiple channels, when variable-length frames are received from a higher layer and are transmitted to a plurality of transmitters, and to provide a multi-channel transmitter using the apparatus and method.

In addition, the present invention provides an apparatus and method for preserving a frame sequence and distributing traffic in a multi-channel link, which distribute a load while preserving the sequence of frames transmitted from a higher layer when a link between devices is implemented using multiple parallel channels as in a WDM/SCM-PON, thus efficiently using multiple channels, and to provide a multi-channel transmitter using the apparatus and method.

The present invention provides an apparatus for preserving a frame sequence and distributing traffic in a multi-channel link, comprising a transmitting buffer module for receiving frames from a higher layer and storing the frames; a first switching unit for switching the frames received from the transmitting buffer module to a plurality of paths; a sequence preservation buffer unit for outputting the frames after storing the frames in at least one sequence preservation buffer for a Sequence Preservation Service Time (SPST); a second switching unit for switching the frames output from the sequence preservation buffer unit to at least one idle transmitter at a termination point of the SPST; and a sequence preservation scheduler for predicting a transmission service finish time according to frame length, determining the SPST on the basis of the predicted transmission service finish time, determining a sequence of available sequence preservation buffers and a sequence of available transmitters using the number of busy sequence preservation buffers, storing the frames, and the number of idle transmitters, and controlling scheduling of the first and second switching units and the sequence preservation buffer unit.

Further, the present invention provides a method of preserving a frame sequence and distributing traffic in a multi-channel link, comprising the first step of receiving frames from a higher layer and storing the frames; the second step of determining whether at least one idle transmitter exists, and scheduling the stored frames to be transmitted to at least one sequence preservation buffer if at least one idle transmitter exists; the third step of receiving the frames according to the scheduling, storing the frames in a designated sequence preservation buffer for a preset sequence preservation service time (SPST) to preserve a frame sequence and then transmitting the frames to the idle transmitter; and the fourth step of the transmitter transmitting the frames to a communication channel.

In addition, the present invention provides a multi-channel transmitter, comprising a transmitting buffer module for storing frames received from a higher layer; a sequence preservation distribution module for receiving the frames from the transmitting buffer module, distributing the frames to at least one transmitter, and transmitting the frames after storing the frames for a sequence preservation service time (SPST) so as to preserve a sequence of frames even if an idle transmitter exists; and a transmitting module for receiving the frames from the sequence preservation distribution module on a single-frame-at-a-time basis, and transmitting the frames to a communication channel within a predictable service time according to frame length.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
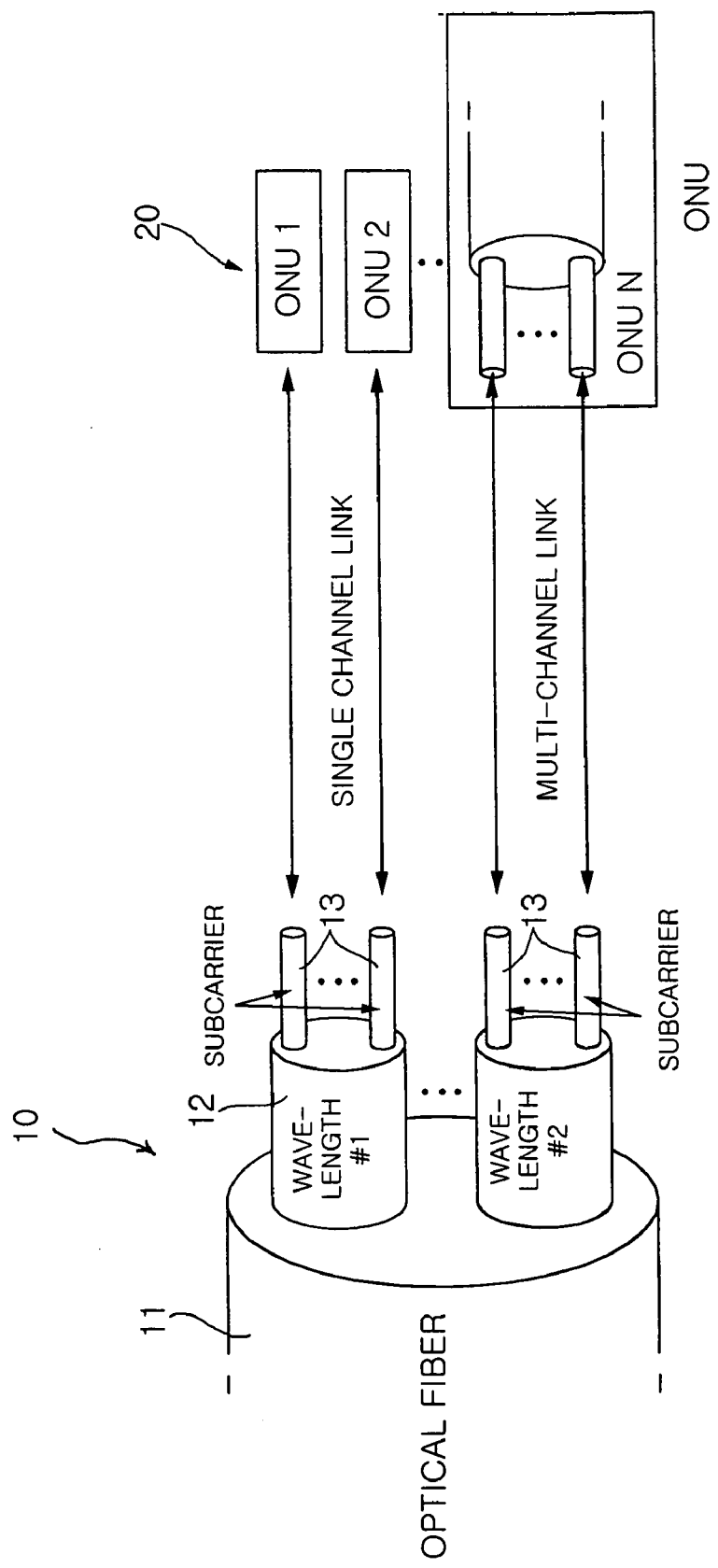
FIG. 1 is a view showing the construction of link multiplexing in WDM/SCM, to which the present invention is applied.

The present invention provides an apparatus and method for preserving a channel aggregation frame sequence and distributing traffic, which can efficiently support a multi-channel aggregation function in a Wavelength Division Multiplexing (WDM)/Subcarrier Multiplexing (SCM)-Passive Optical Network (PON) that transmits variable-length frames through multiple channels, and provides a multi-channel transmitter using the apparatus and method. In detail, the present invention provides an apparatus and method for distributing frames, which can guarantee the sequence of frames transferred between a transmission node and a reception node without adding a special function to a reception stage, in order to efficiently use a link connected through SCM-type multiple channels, and provides a multi-channel transmitter using the apparatus and method. In particular, since the lengths of frames are variable when the Ethernet interfaces with a WDM/SCM subscriber network, the present invention discloses a scheduling technique for distributing traffic while guaranteeing the arrival sequence of frames to efficiently utilize a link, and a sequence preservation buffer for preserving the transmission sequence of frames.

Preferred embodiments of the present invention are described with reference to the attached drawings. Reference now should be made to the drawings, in which the same reference numerals are used throughout the different drawings to designate the same or similar components. In the following description of the present invention, detailed descriptions may be omitted if it is determined that the detailed descriptions of related well-known functions and construction may make the gist of the present invention unclear.

FIG. 1 is a view showing the construction of link multiplexing in a Wavelength Division Multiplexing (WDM)/Subcarrier Multiplexing (SCM)-Passive Optical Network (PON) to which the present invention is applied. Referring to FIG. 1, a plurality of wavelengths 12 and a plurality of subcarriers 13 constitute a multi-channel with respect to a single optical fiber 11. Further, a plurality of channels (SCM channels) constructed by the plurality of subcarriers 13 exists with respect to a single wavelength 12. An Optical Line Terminal (OLT) and Optical Network Units (ONUs) are connected in a point-to-point manner through the plurality of SCM channels, so that a transmission band can extend. Referring to FIG. 1, a single channel link connects an OLT 10 to an ONU 20 through a single SCM channel. A multi-channel link connects the OLT 10 to the ONU 20 through a plurality of SCM channels. In this way, in the case of a multi-channel link in which a plurality of SCM channels are connected in parallel, it is important to preserve the sequence of frames when the frames are transmitted or received.

The present invention provides a method of distributing frame traffic while preserving the sequence of frames in a multi-channel link, as described above.

Figure 2:
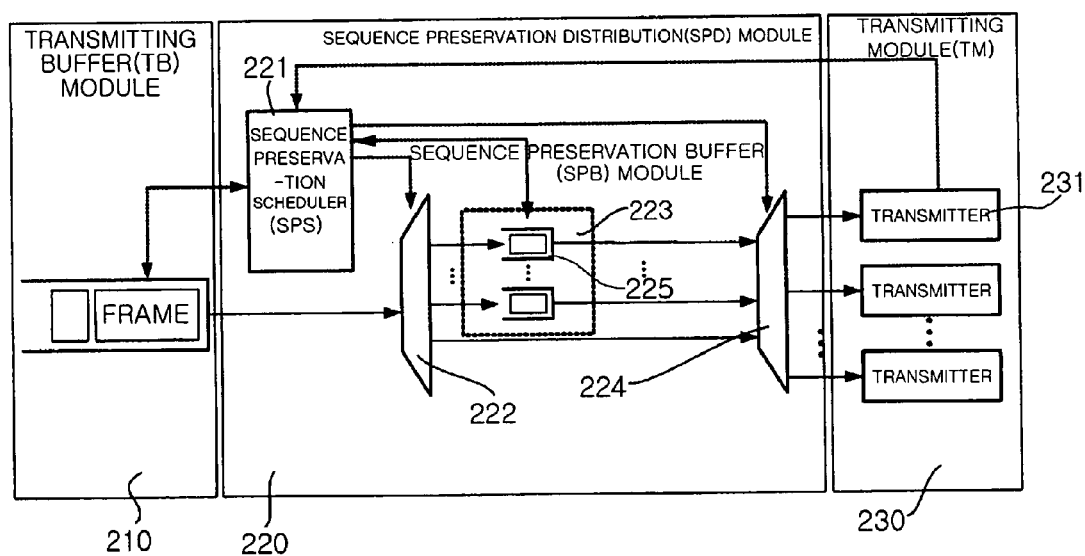
FIG. 2 is a view schematically showing the construction of an apparatus for preserving a frame sequence and distributing traffic in a multi-channel link according to the present invention.

FIG. 2 is a view showing the construction of an apparatus for preserving a frame sequence and distributing traffic in a multi-channel link according to an embodiment of the present invention. Referring to FIG. 2, the frame sequence preservation and traffic distribution apparatus in a multi-channel link according to the present invention includes a Transmitting Buffer (TB) module 210, a Sequence Preservation Distribution (SPD) module 220, and a Transmitting Module (TM) 230. The TB module 210 efficiently stores frames, is shared by all SCM transmitters 231, and reduces frame traffic congestion occurring due to the difference between processing speeds of higher/lower layers. The SPD module 220 receives the frames from the TB module 210, distributes the received frames to the plurality of SCM transmitters 231, and transmits the frames at scheduled times after temporarily storing the frames so as to preserve the transmission sequence of the frames, thus preserving the transmission sequence of the frames and distributing the frame traffic. The TM 230 receives the frames from the SPD module 220 on a single-frame-at-a-time basis and transmits the frames to a communication channel within a predictable service period according to frame length.

With reference to FIG. 2, the construction of the frame sequence preservation and traffic distribution apparatus in a multi-channel link according to the present invention is described in detail. The apparatus includes the TB module 210 for receiving frames from a higher layer and storing the frames therein, a first switching unit 222 for switching the frames received from the TB module 210 to a plurality of paths, a Sequence Preservation Buffer (SPB) unit 223 for storing the switched frames in at least one sequence preservation buffer 225 for a Sequence Preservation Service Time (SPST) and then outputting the frames, a second switching unit 224 for switching the frames, output from the SPB unit 223, to at least one idle transmitter 231 at the termination point of the SPST, and a Sequence Preservation Scheduler (SPS) 221 for predicting a transmission service finish time according to frame length, determining the SPST on the basis of the predicted transmission service finish time, determining the sequence of available sequence preservation buffers and available transmitters using the number of busy sequence preservation buffers (#BSPB) storing frames and the number of idle transmitters (#IT), and controlling the switching and outputting operation performed by the first and second switching units 222 and 224 and the SPB unit 223.

As shown in FIG. 2, the SPD module 220 collects information from the TB module 210 and the TM 230, executes an algorithm for sequence preservation, and generates control signals for the first and second switching units 222 and 224 and the SPB unit 223 on the basis of the algorithm execution results. In this case, status information (F) collected from the TB module 210 indicates whether frames exist in the TB module 210. Further, status information (S[M]) according to SCM transmitters, collected from the TM 230, indicates the status of transmission services according to the SCM transmitters. Therefore, the sequence preservation scheduler (SPS) 221 of the SPD module 220 receives the status information S[M] collected from the TM 230, thus recognizing the number of transmitters 231 capable of currently transmitting frames (#IT: the number of idle transmitters). Further, the SPS 221 of the SPD module 220 receives the number of busy sequence preservation buffers 225 (#BSPB) storing frames from the SPB unit 223. The SPS 221 predicts a Transmission Service Finish Time (TSFT) for a current frame (N) on the basis of the information about #IT and #BSPB, compares the predicted TSFT with a Previous Service Finish Time (PSFT) for a previous service frame (N-1 frame), and then determines a Sequence Preservation Service Time (SPST) for preserving the sequence of frames. In this case, if the determined SPST is greater than 0, the corresponding frame is stored in the SPB unit 223 through the first switching unit 222 in response to a control signal output from the SPS 221. At this time, the number of an SPB 225 storing the frame and a sequence preservation service finish time are recorded and managed.

The first switching unit 222 functions to establish a physical link for connecting the frames received from the TB module 210 to a designated SPB 225 in response to a control signal output from the SPS 221. The frames received in this way are stored for a Sequence Preservation Service Time (SPST), and thereafter transmitted to an idle transmitter 231 through the second switching unit 224. The second switching unit 224 functions to establish a physical link for connecting the frames stored in the SPB unit 223 to the idle transmitter 231 in response to a control signal output from the SPS 221. At this time, the SPB unit 223 implements a sequence preservation buffer using the function of storing the frames for the Sequence Preservation Service Time (SPST), thus providing a path allowing a frame in the TB module 210 to be transmitted first if the TSFT for the frame in the TB module 210 is greater than PSFT. Therefore, as the number of SPBs 225 increases, transmission performance is improved. However, if it is assumed that all input frames belong to the same conversation, it is not only impossible to service received frames to a transmitter that is currently transmitting frames even if the TSFT for the received frames is long, but also impossible to transmit frames even if an idle transmitter exists because a frame standing by for being transmitted exists in the SPB unit 223. Therefore, there is no need to implement the number of SPBs (#SPB) to be greater than the number of transmitters (#T).

In the meantime, the above-described frame sequence preservation and traffic distribution apparatus in a multi-channel link of the present invention can be implemented in a multi-channel transmitter. That is, the multi-channel transmitter according to the present invention includes a Transmitting Buffer (TB) module 210, a Sequence Preservation Distribution (SPD) module 220, and a Transmitting Module 230. The TB module 210 stores frames received from a higher layer. The SPD module 220 distributes the frames received from the transmitting buffer module 210 to at least one transmitter, and includes at least one Sequence Preservation Buffer (SPB) 225 for transmitting the received frames after storing the frames for a Sequence Preservation Service Time (SPST) so as to preserve the sequence of the frames even if an idle transmitter exists. The TM 230 receives the frames from the SPD module 220 on a single-frame-at-a-time basis and transmits the frames to a communication channel within a predictable service period according to frame length. Further, the multi-channel transmitter can be implemented to distribute and transmit traffic to the transmission line of a multi-channel link without inverting the transmission sequence of frames. In this case, the SPD module 220 may further include a Sequence Preservation Scheduler (SPS) 221 for predicting a Transmission service Time (TT) for each frame according to frame length, comparing a Transmission Service Finish Time (TSFT) for a current frame with a PSFT for a previous frame, determining a Sequence Preservation Service Time (SPST) on the basis of the comparison results, and controlling the scheduling of the frames according to the determined SPST. This multi-channel transmitter can be implemented as a means for transmitting frames through multiple channels in a WDM/SCM-PON.

Figure 3:
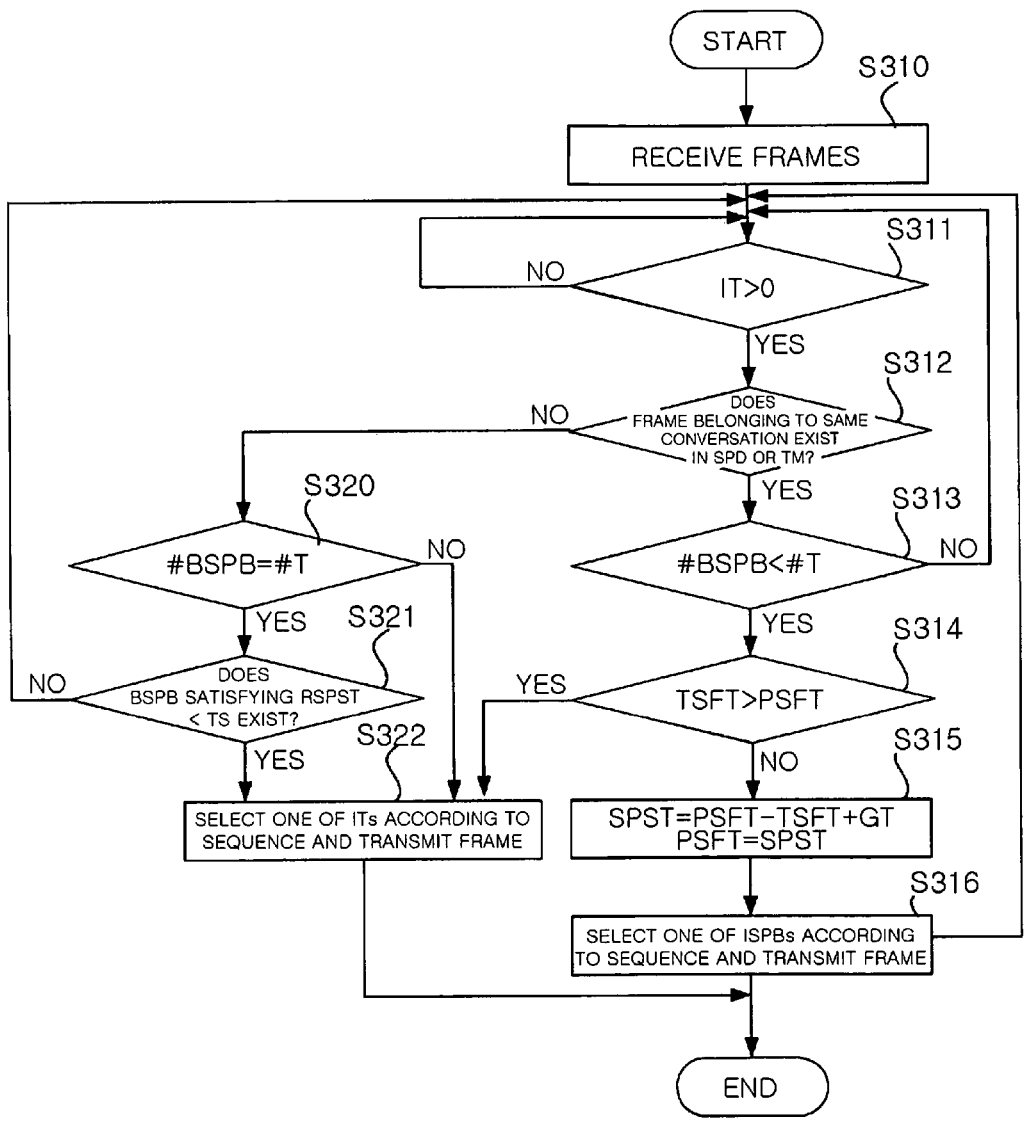
FIG. 3 is a flowchart of a method of distributing frames based on sequence preservation in a multi-channel link according to the present invention.

FIG. 3 is a flowchart of a method of distributing frame traffic based on sequence preservation in a multi-channel link according to the present invention. FIG. 3 illustrates the flowchart for sequence preservation and traffic distribution implemented by the sequence preservation scheduler 221 of FIG. 2. With reference to FIGS. 2 and 3, the method of distributing frame traffic based on sequence preservation in a multi-channel link according to the present invention is described. First, the SPS 221 schedules frames when one or more transmitters 231 are in an idle state and frames exist in the TB module 210. The reason for assigning such a condition is that, if scheduling is performed at a frame arrival time point, information must be managed with respect to each frame, and then control is complicated. Therefore, the present invention performs scheduling only when it is verified that the number of idle transmitters (#IT) is 1 or more.

Referring to FIG. 3, the TB module 210 receives a given frame from a higher layer and stores the frame at step S310. Then, it is determined whether the number of idle transmitters existing in the TM 230 is equal to or greater than 1 at step S311. If the number of idle transmitters is equal to or greater than 1, a frame belonging to the same conversation as that of the given frame exists in the SPD module 220 or the TM 230 at step S312. If a frame belonging to the same conversation does not exist in the SPD module 220 or the TM 230, the number of busy SPBs 225 (#BSPB), currently servicing frames, is compared to the number of idle transmitters 231 (#IT) at step S320. If #BSPB is equal to #IT at step S320, a Rest Sequence Preservation Service Time (RSPST) is compared to a Transmission service Time (TT) required to transmit the frame at step S321. If RSPST is greater than TT, the current frame can be transmitted before the SPST is terminated, so that one of idle transmitters (IT) is immediately selected according to sequence and the frame is transmitted to the selected transmitter at step S322.

However, even though the frame belonging to the same conversation exists in the SPD module 220 or the TM 230 at step S312, the number of busy SPBs 225 (#BSPB), currently servicing frames, is compared to the number of idle transmitters 231 (#IT) at step S313. If #IT is greater than #BSPB, a Transmission Service Finish Time (TSFT) for a current frame is compared to a Previous Service Finish Time (PSFT) for a previous frame belonging to the same conversation as that of the current frame at step S314. If TSFT is greater than PSFT, the frame can be immediately transmitted, so that one of idle transmitters (IT) is selected according to sequence and the frame is transmitted to the selected transmitter at step S322. However, if TSFT is equal to or less than PSFT, a Sequence Preservation Service Time (SPST) is determined using the following Equation [1] at step S315, $$SPST = PSFT - TSFT + GT \quad [1]$$

where PSFT is the service finish time for a previous frame, TSFT is the transmission service finish time for a current frame, and GT is a guard time.

Next, when the SPST is determined, one of idle SPBs is selected according to sequence and the frame is transmitted to the selected SPB at step S316.

Figure 4:
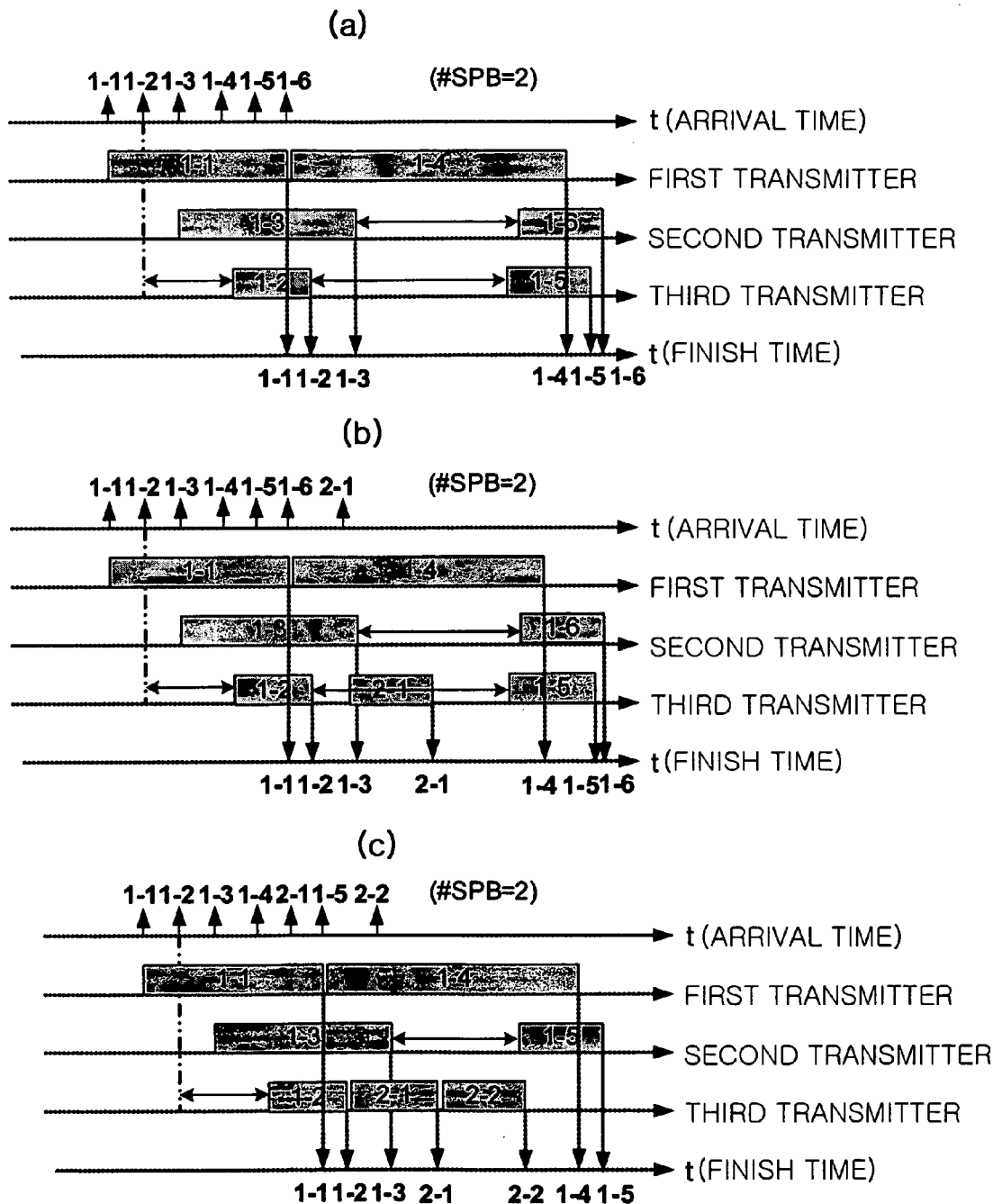
FIGS. 4a to 4c are views showing examples of frame flow resulting from the method of preserving a frame sequence and distributing traffic in a multi-channel link according to the present invention.

FIGS. 4a to 4c are views showing examples of frame flow resulting from the method of preserving a frame sequence and distributing traffic in a multi-channel link according to the present invention. FIGS. 4a to 4c illustrate examples of the method of distributing frame traffic based on the transmission sequence of frames and service finish time when it is assumed that the number of transmitters (#T) is 3, and the number of SPBs (#SPB) is 2. FIG. 4a illustrates the transmission sequence of frames and a service finish time when the frames are received through the apparatus of the present invention in the case in which the frames have different arrival times and different lengths while belonging to the same conversation. In FIG. 4a, a 1-2 frame is scheduled immediately when it arrives at the TB module 210, but is shorter than a 1-1 frame and is first stored in the SPB module 220. After a time SPST has elapsed, the 1-2 frame is transmitted to a third transmitter in an idle state. A 1-3 frame having a longer length and having a Previous Service Finish Time (PSFT) for a previous frame greater than a TSFT for a current frame is scheduled immediately when it arrives at the TB module 210, and is transmitted to a second transmitter. A 1-4 frame is scheduled and transmitted to the first transmitter after the first transmitter is switched to an idle state. FIG. 4a shows that 1-5 and 1-6 frames are transmitted using a method similar to the above procedure.

FIG. 4b illustrates an example of a method of transmitting frames belonging to different conversations. A 1-4 frame is scheduled similar to the case of FIG. 4a, and a 2-1 frame is scheduled after the transmission of a 1-2 frame has terminated. At this time, since a frame belonging to the same conversation as that of the 2-1 frame does not exist in the SPD module 220 or the TM 230, the 2-1 frame is immediately transferred to the third transmitter and then transmitted. After the transmission of a 1-3 frame has terminated, the SPS 221 performs scheduling for a 1-5 frame. However, since a frame belonging to the same conversation as that of the 1-5 frame exists in the TM 230, an SPST is calculated with respect to the 1-5 frame, and the 1-5 frame is stored in the SPB module 220 for the calculated SPST and remains in a standby state for transmission. A 2-2 frame is scheduled and transmitted to the third transmitter after the transmission of the 2-1 frame has terminated.

FIG. 4c illustrates an example of the case in which, when frames belonging to different conversations are transmitted, a frame belonging to a conversation is directly transmitted to a transmitter while another frame belonging to another conversation that has arrived at the TB module 210 earlier than the frame is buffered in the SPB module 220, thus improving the utility of a link. A 1-4 frame is scheduled similar to the case of FIG. 4a. A 1-2 frame is scheduled immediately when it arrives at the TB module 210, but it is first stored in the SPB module 220 because the 1-2 frame is shorter than the 1-1 frame. After an SPST has elapsed, the 1-2 frame is transmitted to a third transmitter in an idle state. A 1-3 frame having a longer length and having a Previous Service Finish Time (PSFT) for a previous frame greater than a TSFT for a current frame is scheduled immediately when it arrives at the TB module 210, and is transmitted to a second transmitter. 2-1 and 2-2 frames are scheduled and transmitted to the third transmitter after the third transmitter is switched to an idle state. A 1-4 frame is scheduled and transmitted to the first transmitter after the first transmitter is switched to an idle state. A 1-5 frame is also transmitted in a manner similar to the above method.

Accordingly, the present invention can realize the following advantages through the construction of an apparatus and method proposed by the present invention when a link between devices is implemented using multiple parallel channels and variable-length frames are transmitted.

First, the present invention can prevent the inversion of a frame sequence occurring during the parallel transmission of variable length frames.

Second, the present invention can equally distribute a load to multiple channels while preserving the sequence of frames, thus preventing load concentration.

Third, since load concentration is minimized, not only can a transmission delay, a buffer size, etc. be reduced, but also the throughput of traffic is maximized, so that the link can be efficiently used when bandwidth is increased due to a channel addition and assignment method.

Fourth, the present invention does not modify a service frame at the time of transmission, thus simplifying the construction of a reception unit.

Fifth, the present invention can be implemented using a simple algorithm, so that the implementation of complicated hardware is not required.

Sixth, the present invention can equally divide and transmit frame traffic without considering a conversation, which is part of an algorithm, so that a link can be efficiently used at the time of parallel transmission, regardless of protocol.

The above-described detailed description and drawings are disclosed for technical spirit of an apparatus and method for preserving a frame sequence and distributing traffic in a multi-channel link according to the present invention. These are only preferred embodiments, but the present invention is not limited to the preferred embodiments. Further, those skilled in the art will appreciate that various modifications, additions and substitutions are possible, without departing from the scope and spirit of the invention as disclosed in the accompanying claims.

Therefore, the scope and spirit of the present invention must be defined by the accompanying claims, not by the description and drawings.

What is claimed is:

1. An apparatus for preserving a frame sequence and distributing traffic in a multi-channel link, comprising:
   a transmitting buffer module for receiving frames from a higher layer and storing the frames;
   a first switching unit for switching the frames received from the transmitting buffer module to a plurality of paths;
   a sequence preservation buffer unit for outputting the frames after storing the frames in at least one sequence preservation buffer for a sequence preservation service time (SPST);
   a second switching unit for switching the frames output from the sequence preservation buffer unit to at least one idle transmitter at a termination point of the SPST; and
   a sequence preservation scheduler for predicting a transmission service finish time according to frame length, determining the SPST on the basis of the predicted transmission service finish time, determining a sequence of available sequence preservation buffers and a sequence of available transmitters using the number of busy sequence preservation buffers, storing the frames, and the number of idle transmitters, and controlling scheduling of the first and second switching units and the sequence preservation buffer unit,
   wherein the sequence preservation scheduler compares a transmission service finish time for each of the frames with a previous service finish time (PSFT) for a previous frame with respect to each conversation, determines a transmission sequence of frames belonging to the same conversation on the basis of a transmission service time according to frame length, and performs scheduling of the frames.

2. The frame sequence preservation and traffic distribution apparatus according to claim 1, wherein the sequence preservation scheduler performs scheduling at a point at which a corresponding frame arrives at the transmitting buffer module, when the frame arrives at the transmitting buffer module and one or more transmitters are in an idle state.

3. The frame sequence preservation and traffic distribution apparatus according to claim 1, wherein the sequence preservation scheduler receives the number of busy sequence preservation buffers (#BSPB) storing frames from the sequence preservation buffer unit, predicts a transmission service finish time (TSFT) for a current frame (N) on the basis of the number of busy sequence preservation buffers, compares the TSFT for a current frame with a previous service finish time (PSFT) for a previous frame (N−1), and then determines a sequence preservation service time (SPST) for preservation of the sequence of frames.

4. The frame sequence preservation and traffic distribution apparatus according to claim 3, wherein the sequence preservation scheduler first schedules a frame stored in a sequence preservation buffer when the previous service finish time (PSFT) for the previous frame (N−1) stored in the sequence preservation buffer is greater than the transmission service finish time (TSFT) for the current frame (N).

5. The frame sequence preservation and traffic distribution apparatus according to claim 1, wherein the first switching unit switches the frames to the sequence preservation buffer unit when the sequence preservation service time (SPST) is greater than 0.

6. A multi-channel transmitter, comprising:
   a transmitting buffer module for storing frames received from a higher layer;
   a sequence preservation distribution module for receiving the frames from the transmitting buffer module, distributing the frames to at least one transmitter, and transmitting the frames after storing the frames for a sequence preservation service time (SPST) so as to preserve a sequence of frames even if an idle transmitter exists; and
   a transmitting module for receiving the frames from the sequence preservation distribution module on a single-frame-at-a-time basis, and transmitting the frames to a communication channel within a predictable service time according to frame length,
   wherein the sequence preservation scheduler compares a transmission service finish time for each of the frames with a previous service finish time (PSFT) for a previous frame with respect to each conversation, determines a transmission sequence of frames belonging to the same conversation on the basis of a transmission service time according to frame length, and performs scheduling of the frames.

7. A method of preserving a frame sequence and distributing traffic in a multi-channel link, comprising:
   the first step of receiving frames from a higher layer and storing the frames;
   the second step of determining whether at least one idle transmitter exists, and scheduling the stored frames to be transmitted to at least one sequence preservation buffer if at least one idle transmitter exists;

the third step of receiving the frames according to the scheduling, storing the frames in a designated sequence preservation buffer for a preset sequence preservation service time (SPST) to preserve a frame sequence and then transmitting the frames to the idle transmitter; and the fourth step of the transmitter transmitting the frames to a communication channel, wherein the second step comprises the steps of:

predicting a transmission service finish time (TSFT) for a current frame (N) using the number of sequence preservation buffers storing the frames;

comparing the TSFT with a previous service finish time (PSFT) for a previous frame (N-1and determining a sequence preservation service time (SPST) on the basis of the comparison results; and transmitting the frames to the designated sequence preservation buffer when the SPST is greater than 0.

8. The frame sequence preservation and traffic distribution method according to claim 7, wherein the second step comprises the steps of:

determining whether a frame belonging to the same conversation as that of the received frames exists in the sequence preservation buffer or transmitter when one or more idle transmitters exist;

comparing a transmission service finish time (TSFT) for a current frame with a previous service finish time for a previous frame when the frame belonging to the same conversation exists and the number of idle transmitters is greater than the number of sequence preservation buffers;

selecting one of idle transmitters according to sequence and transmitting the frames to the selected transmitter if TSFT is greater than PSFT; and re-determining an SPST, selecting one of idle sequence preservation buffers according to sequence and transmitting the frames to the selected sequence preservation buffer if TSFT is less than PSFT.

* * * * *